United States Patent
Wiradjaja et al.

(10) Patent No.: US 11,148,316 B2
(45) Date of Patent: Oct. 19, 2021

(54) METHOD FOR ALIGNING A CUTTER PLATE USING A REMOTE ALIGNMENT ADJUSTMENT DEVICE

(71) Applicant: Basell Polyolefine GmbH, Wesseling (DE)

(72) Inventors: Arfie Wiradjaja, Bergisch Gladbach (DE); Guenter Sachs-Weingaertner, Grossmehring (DE)

(73) Assignee: Basell Polyolefine GmbH, Wesseling (DE)

( * ) Notice: Subject to any disclaimer, the term of this patent is extended or adjusted under 35 U.S.C. 154(b) by 11 days.

(21) Appl. No.: 16/640,019

(22) PCT Filed: Aug. 22, 2018

(86) PCT No.: PCT/EP2018/072607
§ 371 (c)(1),
(2) Date: Feb. 18, 2020

(87) PCT Pub. No.: WO2019/038312
PCT Pub. Date: Feb. 28, 2019

(65) Prior Publication Data
US 2020/0246996 A1    Aug. 6, 2020

(30) Foreign Application Priority Data
Aug. 24, 2017 (EP) .................... 17187821

(51) Int. Cl.
*B26D 7/26* (2006.01)
*B26D 1/29* (2006.01)

(52) U.S. Cl.
CPC ............. *B26D 7/2628* (2013.01); *B26D 1/29* (2013.01)

(58) Field of Classification Search
CPC ........ B26D 7/2628; B26D 1/29; B26D 5/007; B29B 9/065; B29C 47/0066; B29C 47/92; B29C 47/0011; B29C 2793/00
See application file for complete search history.

(56) References Cited

U.S. PATENT DOCUMENTS 2,252,900 A    8/1941   Shafer
3,973,890 A    8/1976   Porter et al.
(Continued)

FOREIGN PATENT DOCUMENTS

CN    1386615 A      12/2002
CN    108698209 A    10/2018
(Continued)

OTHER PUBLICATIONS

The International Search Report and Written Opinion for PCT/EP2018/072607 dated Sep. 20, 2018.

*Primary Examiner* — Jonathan G Riley

(57) ABSTRACT

A method for aligning a cutter plate in a pelletizer for polymer pellets using a remote alignment adjustment device having a mechanical distance measurement probe and a camera for taking photos or videos. The remote alignment adjustment device is attached to the drive shaft of the cutter plate and rotates with the shaft to correct the alignment in different positions of the die plate. Additionally, a process for preparing polyethylene pellets in a pelletizer using the method for aligning the cutter plate.

19 Claims, 5 Drawing Sheets

(56) References Cited

U.S. PATENT DOCUMENTS

| | | | |
|---|---|---|---|
| 5,330,340 A * | 7/1994 | Suppon | B29C 48/92 |
| | | | 425/142 |
| 5,641,522 A | 6/1997 | Satanovsky | |
| 6,099,288 A | 8/2000 | Long | |
| 6,575,069 B1 | 6/2003 | Harwarth et al. | |
| 2006/0121142 A1 * | 6/2006 | Pinchot | B26D 1/28 |
| | | | 425/208 |
| 2007/0172533 A1 * | 7/2007 | Pinchot | B26D 1/28 |
| | | | 425/142 |
| 2007/0259067 A1 * | 11/2007 | Pinchot | B26D 7/2614 |
| | | | 425/208 |
| 2010/0143520 A1 * | 6/2010 | Pinchot | B29C 48/92 |
| | | | 425/142 |
| 2010/0323047 A1 | 12/2010 | Fridley | |
| 2013/0221557 A1 * | 8/2013 | Yonesato | B29C 43/08 |
| | | | 264/40.6 |
| 2017/0334117 A1 * | 11/2017 | Manabe | B26D 1/36 |

FOREIGN PATENT DOCUMENTS

| | | |
|---|---|---|
| DE | 1959507 A1 | 6/1971 |
| DE | 102012104066 A1 | 11/2013 |
| EP | 1413413 A1 | 4/2004 |
| JP | H0596533 A | 4/1993 |
| JP | 2004230874 A | 8/2004 |
| JP | 2016117188 A | 6/2016 |
| WO | 9117034 A1 | 11/1991 |
| WO | 0194088 A2 | 12/2001 |
| WO | 2016098422 A1 | 6/2016 |

\* cited by examiner

METHOD FOR ALIGNING A CUTTER PLATE USING A REMOTE ALIGNMENT ADJUSTMENT DEVICE

This application is the U.S. National Phase of PCT International Application PCT/EP2018/072607, filed Aug. 22, 2018, claiming benefit of priority to European Patent Application No. 17187821.8, filed Aug. 24, 2017, the disclosures of which are incorporated herein by reference in their entirety.

FIELD OF THE INVENTION

The present disclosure provides a method for aligning a cutter plate using a remote alignment adjustment device and a process for preparing polyethylene pellets in a pelletizer using the remote alignment adjustment device.

BACKGROUND OF THE INVENTION

Pellets are made by extruding and cutting a polymer material. For cutting pellets, a die plate is used having apertures for heated and liquefied polymer material. A plurality of rotating blades cut the polymer strands emerging from the apertures. If an underwater cutter is used, water transports and cools the resulting pellets. The quality of pellets depends on a correct alignment of the cutter plate having the blades. When the polymer strands emerge from apertures of the die plate, the strands are not fully cool. In some instances, the inside of strands are hot or warm, allowing the strands to be easily deformed. Alignment of the cutter plate to the alignment of the apertures results in a well-defined cutting profile of the pellets.

SUMMARY OF THE INVENTION

In a general embodiment, the present disclosure provides a method for aligning a cutter plate in a pelletizer for polymer pellets using a remote alignment adjustment device, wherein the pelletizer has a) a cutter plate having a plurality of blades, b) a die plate having a plurality of apertures for extrudate strands, a first side facing the cutter plate, and an opposing second side facing away from the cutter plate, and c) a drive shaft fixedly connected to the cutter plate, and the remote alignment adjustment device is connectable to a data processing device and has a') a mechanical distance measurement probe, b') a camera for taking photos or videos, and c') a mounting device attachable to the drive shaft, includes the steps of:
  i) attaching the remote alignment adjustment device to the drive shaft using the mounting device such that the remote alignment adjustment device is fixedly connected to the drive shaft and the mechanical distance measurement probe contacts a first position of the die plate obtaining measuring data of the first position in form of photos or videos,
  ii) transmitting the measuring data of the first position of the die plate from the remote alignment adjustment device to the data processing device,
  iii) rotating the drive shaft to a second position of the die plate such that the mechanical distance measurement probe contacts a second position of the die plate obtaining measuring data of the second position in form of photos or videos,
  iv) transmitting the measuring data of the second position of the die plate from the remote alignment adjustment device to the data processing device,
  v) adjusting the alignment of the cutter plate or the die plate based on measuring data of the first and second positions supplied by the data processing device, and
  vi) removing the remote alignment adjustment device from the pelletizer.

In some embodiments, the mechanical distance measurement probe has a dial indicator gauge.

In some embodiments, the dial indicator gauge is closer to the cutter plate than the camera in steps i) to v).

In some embodiments, the method further includes the steps of:
  a1) rotating the drive shaft to a third position of the die plate such that the mechanical distance measurement probe contacts a third position of the die plate obtaining measuring data of the third position in form of photos or videos,
  a2) transmitting the measuring data of the third position of the die plate from the remote alignment adjustment device to the data processing device,
  b1) rotating the drive shaft to a fourth position of the die plate such that the mechanical distance measurement probe contacts a fourth position of the die plate obtaining measuring data of the fourth position in form of photos or videos, and
  b2) transmitting the measuring data of the fourth position of the die plate from the remote alignment adjustment device to the data processing device.

In some embodiments, the die plate maintains at least in a section a temperature that differs no more than 50° C. from the section's operating temperature, wherein the operating temperature is the temperature of the section when pelletizing for at least two hours.

In some embodiments, the die plate has at least in a section a temperature of 180 to 280° C. that is maintained using a heating fluid.

In some embodiments, the mounting device has a flexible and deformable connecting structure that remains rigid when no stronger force than the force of gravitation is applied.

In some embodiments, the mounting device has a clamp or screws for fixedly connecting the remote alignment adjustment device to the drive shaft.

In some embodiments, the remote alignment adjustment device has a light source. In some embodiments, the remote alignment adjustment device has a camera that is an endoscope.

In some embodiments, the polymer pellets are made from polyethylene, alternatively high-density polyethylene (HDPE).

In some embodiments, the remote alignment adjustment device is connected wirelessly to the data processing device.

In some embodiments, the data processing device is configured to analyze the measuring data of the mechanical distance measurement probe and provide adjustment values based on the measuring data for manual adjustment of the cutter plate or the die plate.

In some embodiments, the cutter plate and the die plate are arranged within a chamber and the manual adjustment is provided by regulating screws arranged externally of the chamber for changing the adjustment of the cutter plate or the die plate.

In some embodiments, the cutter plate and the die plate are arranged within a chamber which is configured and designed to be filled with water, wherein the chamber has a reclosable opening for insertion of the remote alignment adjustment device.

In some embodiments, the present disclosure provides a process for preparing polyethylene pellets in a pelletizer having a) a cutter plate having a plurality of blades, b) a die plate having a plurality of apertures for extrudate strands, a first side facing the cutter plate, and an opposing second side facing away from the cutter plate, and c) a drive shaft fixedly connected to the cutter plate, wherein the cutter plate and the die plate are arranged within a chamber, for use with a remote alignment adjustment device connectable to a data processing device and having a') a mechanical distance measurement probe, b') a camera for taking photos or videos, and c') a mounting device attachable to the drive shaft, including the steps of:

1) melting polyethylene in an extruder,
2) pushing of the melted polyethylene through the die plate, thereby forming extrudate strands,
3) cutting the resulting strands with the blades of the cutter plate into pellets,
4) stopping the extruder and the pelletizer for maintenance,
5) removing water from the chamber,
6) aligning of the cutter plate or the die plate,
7) refilling the chamber with water, and
8) continuing with pelletizing in accordance with steps 1) to 3).

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

Figure 1:
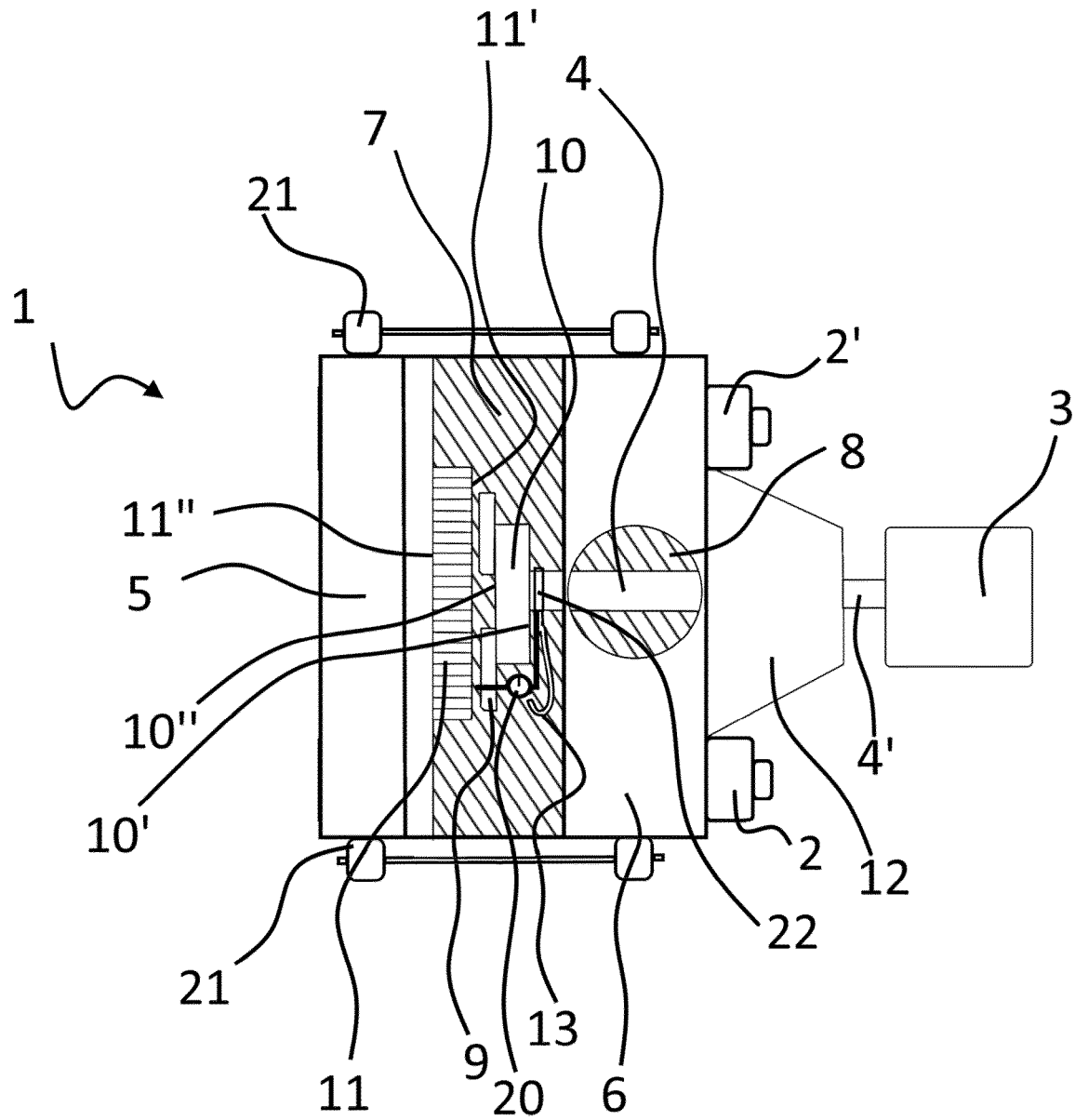
FIG. 1: shows a schematic view of a pelletizer with a remote alignment adjustment device.

In some embodiments, the present disclosure provides a method for aligning a cutter plate in a pelletizer for polymer pellets using a remote alignment adjustment device, wherein the pelletizer has a) a die plate having a plurality of apertures for extrudate strands, a first side facing the cutter plate, and an opposing second side facing away from the cutter plate, b) the cutter plate having a plurality of blades, alternatively at least four blades, alternatively at least 10 blades, alternatively at least 20 blades, and c) a drive shaft fixedly connected to the cutter plate, and the remote alignment adjustment device is connectable to a data processing device, alternatively a data processing device having a display and has a') a mechanical distance measurement probe, b') a camera for taking photos or videos and c') a mounting device attachable to the drive shaft. In some embodiments, the cutter plate and the die plate are arranged within a chamber. In some embodiments, the mechanical distance measurement probe has a dial indicator gauge.

In some embodiments, the method includes the steps of:
i) attaching the remote alignment adjustment device to the drive shaft using the mounting device such that the remote alignment adjustment device is fixedly connected to the drive shaft and the mechanical distance measurement probe contacts a first position of die plate, alternatively using mechanical fastening, obtaining measuring data of the first position in form of photos or videos,
ii) transmitting the measuring data of the mechanical distance measurement probe in form of photos or videos, alternatively a video feed or photos showing a dial indicator gauge of the mechanical distance measurement probe, relating to the first position of the die plate from the remote alignment adjustment device to the data processing device, alternatively to the display of a data processing device,
iii) rotating the drive shaft to a second position of the die plate such that the mechanical distance measurement probe contacts a second position of the die plate obtaining measuring data of the second position in form of photos or videos,
iv) transmitting the measuring data of the mechanical distance measurement probe in form of photos or videos, alternatively a video feed or photos showing a dial indicator gauge of the mechanical distance measurement probe, relating to the second position of the die plate from the remote alignment adjustment device to the data processing device, alternatively to the display of a data processing device,
v) adjusting the alignment of the cutter plate or the die plate, alternatively of the drive shaft and the cutter plate, based on measuring data of the first and second positions supplied by the data processing device, alternatively using numerical values calculated by the data processing device and shown on the display of the data processing device,
vi) removing the remote alignment adjustment device from the pelletizer, alternatively through the reclosable opening of the chamber of the pelletizer.

In some embodiments, the mechanical fastening is achieved with screws or clamps. In some embodiments, the remote alignment adjustment device is attached to the drive shaft in step i) after insertion of the remote alignment adjustment device through the reclosable opening of the chamber of the pelletizer. In some embodiments, the data processing device is selected from the group consisting of a laptop, a personal computer (PC), and a tablet. In some embodiments, the data processing devices is arranged at a distance from the pelletizer.

In some embodiments, the present disclosure relates to the adjustment of the cutter plate by ensuring an optimal orientation of the cutter plate in relation to the die plate. In some embodiments, an optimal angular orientation is a parallel orientation of the cutter plate to the die plate. In some embodiments, the distance is adjusted to minimize the space between the cutter plate and the die plate. In some embodiments, the adjusting the alignment of the cutter plate includes adjusting the distance between die plate and cutter plate as well as the angular orientation of the cutter plate.

In some embodiments, the step i) of attaching the remote alignment adjustment device to the drive shaft using the mounting device such that the remote alignment adjustment device is fixedly connected to the drive shaft and the mechanical distance measurement probe contacts the first position of die plate includes rotating the drive shaft from an attachment position to the first position of die plate of the die plate, that is, the remote attachment adjustment device is attached to the drive shaft and then rotated to the first position. In some embodiments, the remote attachment adjustment device is attached directly such that the mechanical distance measurement probe contacts the first position without any need for rotating the drive shaft. In some embodiments, the attachment is effected such that the first position is contacted by the mechanical distance measurement probe.

As used herein, "and/or" is defined inclusively, such that the term "a and/or b" should be read to include the sets: "a and b", "a or b", "a", and "b". In some instances, "a and/or b" relates to two entities "a" and "b", wherein at least one entity is present.

In some embodiments, the mechanical distance measurement probe has a dial indicator gauge, the camera takes photos or a video of the dial indicator gauge, and the photos and/or video is the measuring data of the mechanical distance measurement probe. In some embodiments, a dial indicator gauge displays the values measured using a contact sensor of the mechanical distance measurement probe.

In some embodiments, the dial indicator gauge is closer to the cutter plate than the camera in steps i), ii), iii), iv) and/or v), alternatively in steps i) to vi), wherein the remote alignment adjustment device is attached to the drive shaft. In some embodiments, a mechanical dial indicator gauge, alternatively a dial indicator gauge working without electricity, is used. In some embodiments and to transmit a signal, alternatively a wireless signal, relating to the dial indicator gauge, the camera for taking photos or videos is constantly focused on the dial indicator gauge. In some embodiments and to protect the camera for taking photos or videos, the camera is removed from the hot cutter plate, alternatively further away from the cutter plate than the dial indicator gauge.

In some embodiments, the camera is connected, alternatively by a wire, to a wireless transmitter or has a wireless transmitter, wherein the wireless transmitter is transmitting the data in steps ii) and iv).

In some embodiments, the mounting device has a clamp or screws for fixedly connecting the remote alignment adjustment device to the drive shaft. In some embodiments, screws for connecting to the drive shaft are screws that interact with the clamp. In some embodiments, the mounting device has screws directly secured to respective apertures in the drive shaft. In some embodiments, the mechanical fastener is easily attached and detached.

In some embodiments, the method includes the steps of:
a1) rotating the drive shaft, alternatively by 50° to 130°, alternatively 70° to 110°, to a third position of the die plate such that the mechanical distance measurement probe contacts a third position of the die plate obtaining measuring data of the third position,
a2) transmitting measuring data of the mechanical distance measurement probe, alternatively a video feed or photos showing a dial indicator gauge of the mechanical distance measurement probe, relating to the third position of the die plate from the remote alignment adjustment device to the data processing device, alternatively to the display of a data processing device,
b1) rotating the drive shaft, alternatively by 50° to 130°, alternatively 70° to 110°, to a fourth position of the die plate such that the mechanical distance measurement probe contacts a fourth position of the die plate obtaining measuring data of the fourth position, and
b2) transmitting measuring data of the mechanical distance measurement probe, alternatively a video feed or photos showing a dial indicator gauge of the mechanical distance measurement probe, relating to the fourth position of the die plate from the remote alignment adjustment device to the data processing device, alternatively to the display of a data processing device.

In some embodiments, the data processing device is selected from the group consisting of a laptop, a personal computer (PC), and a tablet.

In some embodiments, the alignment of the cutter plate is adjusted based on measuring data of 4 to 20 positions, including the first, second, third and fourth position. In some embodiments, the alignment of the cutter plate is adjusted based on measuring data of four to eight different positions of the die plate. In some embodiments, steps a1) to b2) are inserted between steps v) and vi).

In some embodiments, the alignment steps are carried out more than once, the drive shaft is rotated a second time to previously examined first, second, third or fourth positions and measuring data of the mechanical distance measurement probe is transmitted of each position a second time. In some embodiments, the procedure is repeated a third or fourth time until the alignment of the cutter plate is correct, alternatively parallel to the die plate.

In some embodiments, measuring data are data that are used for correcting the alignment of the cutter plates. The measuring data are obtained in form of photos or videos. In some embodiments, the measuring data are data indicating a distance affected by the relative positions of die plate and cutter plate. Measuring data of the first position are data that are at least partially based on information about the first position that is obtained using the remote alignment adjustment device, alternatively the mechanical distance measurement probe. Measuring data of the second position are data that are at least partially based on information about the second position that is obtained using the remote alignment adjustment device, alternatively the mechanical distance measurement probe. Measuring data of the third position are data that are at least partially based on information about the third position that is obtained using the remote alignment adjustment device, alternatively the mechanical distance measurement probe. Measuring data of the fourth position are data about the fourth position that are at least partially based on information that is obtained using the remote alignment adjustment device, alternatively the mechanical distance measurement probe. In some embodiments, measuring data relate to photos or videos of the dial indicator gauge.

In some embodiments, adjusting the alignment of the cutter plate includes the angular orientation and distance of the cutter plate, alternatively in relation to the die plate.

In some embodiments, the cutter plate is adjusted based on measuring data of four positions, the positions being the first, second, third and fourth positions, wherein each position has an angular distance of at least 40° from the closest adjacent position. In some embodiments, the angular distance between adjacent positions is in the range of from 50° to 130° C., alternatively from 70° to 110° C., alternatively from 85° to 95°, such that the angular distances add up to 360°. In some embodiments, the first, second, third and fourth positions are spaced at equal angular distances apart from each other and no other positions are present, that is, each position having a distance of 90° to the closest adjacent position adding up to 360°. In some embodiments, the alignment of the cutter plate is adjusted based on measuring data of four positions, wherein a position in direction of the center of the earth (downwards) indicates 0° and positions are read at 45°, 135°, 225° and 315°.

In some embodiments, the die plate maintains at least in a section a temperature that differs no more than 50° C. from the section's operating temperature, wherein the operating temperature is the temperature of the section when pelletizing for at least two hours. In some embodiments, the temperature differs no more than 25° C., alternatively 10° C., from the operating temperature. When cooling the die plate, the alignment is slightly distorted.

In some embodiments, a fluid, alternatively a water steam at a pressure above atmospheric pressure, is used for heating of the die plate. In some embodiments, the die plate at least in a section, alternatively the whole die plate, has a temperature of 180 to 280° C., alternatively 200 to 260° C. In some embodiments, the temperature is maintained using the heating fluid.

In some embodiments, a single, alternatively rigid, connecting structure is used for connecting the mechanical distance measurement probe with the mounting device, alternatively for connecting the camera with the mounting device. In some embodiments, the mounting device is separated in two individual parts, a first mounting device and a second mounting device, wherein the remote alignment adjustment device has d) a camera connected to a first mounting device that is connectable to the shaft by a first connecting structure and e) a mechanical distance measurement probe connected to a second mounting device that is separately connectable to the shaft by a second connecting structure, wherein the first and second mounting devices are not connected. In some embodiments, the mechanical distance measurement probe is installed first and the camera is installed later. In some embodiments, the remote alignment adjustment device has a single mounting device for the camera and the mechanical distance measurement probe. In some embodiments, the single mounting device has a first and a second connecting structure affixed to the same clamp, alternatively a first connecting structure for the camera and a second connecting structure for the mechanical distance measurement probe, alternatively the mechanical distance measurement probe has the dial indicator gauge.

In some embodiments, the remote alignment adjustment device has a flexible and deformable first connecting structure that remains rigid when no stronger force than the force of gravitation is applied, alternatively for connecting the camera. In some embodiments, the first connecting structure is a wire construct. In some embodiments, the first connecting structure is a gooseneck having a flexible, adjustable shaft. In some embodiments, an inflexible first connecting structure for connecting the camera with the mounting device is use. In some embodiments, the camera is an endoscope.

In some embodiments, the camera is connected using the flexible and deformable first connecting structure wherein the mechanical distance measurement probe is connected using a rigid non-deformable second connecting structure, alternatively a rigid metal framework. In some embodiments, the rigid non-deformable second connecting structure provides reliable data as the rigid second connecting structure is not dislocated accidentally. In some embodiments, the second connecting structure is used for the camera in addition to or instead of a first connecting structure.

In some embodiments, the camera is an endoscope. In some embodiments, a flexible endoscope is used, alternatively having a flexible gooseneck, alternatively as a first connecting structure.

In some embodiments, the remote alignment adjustment device has a light source. In some embodiments, the light source is an LED-lamp. In some embodiments, light is provided by glass fiber bundles that transmit light.

In some embodiments, the polymer pellets are made from polyethylene, alternatively high-density polyethylene (HDPE).

In some embodiments, the remote alignment adjustment device is connected to the data processing device wirelessly. In some embodiments, the remote alignment adjustment device includes a wireless transmitter for transmitting the measuring data. In some embodiments, the alignment adjustment device is connected to the data processing device using a cable. It is believed that in some embodiments and if the mechanical distance measurement probe is shaking, an erroneous signal feed results, alternatively a signal feed of a dial indicator gauge, that is unsuitable for adjustment of the cutter plate with respect to the position of the die plate. In some embodiments, the wireless signal is selected from the group consisting of W-LAN, Bluetooth, and IR-Signals. In some embodiments, the drive shaft is rotated, the cable is rotated, and the cable wraps round the drive shaft.

In some embodiments, the data processing device is connected to a display. In some embodiments, the data processing device converts a digital signal, alternatively the measuring data, into a screen content of a display.

In some embodiments, the data processing device is configured to analyze the data obtained by the remote alignment device, alternatively by the camera, and to provide adjustment values based on the data for manually adjusting the cutter plate or the die plate, alternatively the die plate. In some embodiments, a camera is used while the data processing device is modified to display a video feed and provide adjustment values, that is, numerical values for adjustment. In some embodiments, the values contain information about the settings of external screws of the pelletizer. In some embodiments, the values are used to indicate how much to turn a regulating screw based on indications on the gauge.

In some embodiments, the manual adjustment is achieved with regulating screws arranged externally of the chamber for changing the adjustment of the cutter plate or the die plate. In some embodiments, the first, second, third and fourth positions correspond to a first regulating screw, a second regulating screw, a third regulating screw, and a fourth regulating screw that are arranged outside the chamber. In some embodiments, the first screw is arranged outside opposing the first position, the second screw is arranged outside opposing the second position, the third screw is arranged outside opposing the third position, and the fourth screw is arranged outside opposing the fourth position.

In some embodiments, the die plate is removed for an exchange of the cutter plate and reinserted prior to adjusting the blades. Before removal, the chamber is emptied of water.

In some embodiments, the signal of the camera contains a IR-signal providing information about light in the infrared region. In some embodiments, the hot pelletizer plate is easily detected, thereby providing more precise information. In some embodiments, the video feed of the camera includes a visual video feed using visible light.

In some embodiments, the chamber has a reclosable opening, alternatively a watertight reclosable opening, for insertion of the remote alignment adjustment device, wherein the chamber is configured and designed to be filled with water. In some embodiments, the reclosable opening is in a side wall of the chamber. In some embodiments, the installation of the remote alignment adjusting device in step i) is conducted through the reclosable opening. In some embodiments, the reclosable opening is a small opening, alternatively having a smaller diameter that the cutter plate, that is, the cutter plate cannot be inserted through the reclosable opening.

In some embodiments, the present disclosure provides a process for preparing polyethylene pellets in a pelletizer having a) a cutter plate having a plurality of blades, b) a die plate having a plurality of apertures for extrudate strands, a first side facing the cutter plate, and an opposing second side facing away from the cutter plate, and c) a drive shaft fixedly connected to the cutter plate, wherein the cutter plate and the die plate are arranged within a chamber, for use with a remote alignment adjustment device connectable to a data processing device and having a') a mechanical distance measurement probe, b') a camera for taking photos or videos, and c') a mounting device attachable to the drive shaft, including the steps of:

1) melting polyethylene in an extruder,
2) pushing of the melted polyethylene through the die plate, thereby forming extrudate strands,
3) cutting the resulting strands with the blades of the cutter plate into pellets,
4) stopping the extruder and the pelletizer for maintenance,
5) removing water from the chamber,
6) aligning of the cutter plate or the die plate,
7) refilling the chamber with water, and
8) continuing with pelletizing in accordance with steps 1 to 3.

In some embodiments, the changing of the cutter plate is conducted using blade protection covers for the blades. In some embodiments, the protection covers are magnetic. In some embodiments, the protection covers are made of or containing metal. In some embodiments, a blade protection cover surrounds each blade and is attached magnetically. In some embodiments, the blade protection covers are magnetic covers having a first side wall being connected flexibly to a second side wall, wherein the first side wall is magnetically connectable to a first side of the blade and the second side wall is magnetically connectable to the opposing second side of the blade and the flexible region is arranged above the cutting edge of the blade. In some embodiments, the protection covers are removed before the alignment method.

FIG. 1 shows a schematic view of a pelletizer (1) with a remote alignment adjustment device having a camera (13). The pelletizer has a die plate (11) having a plurality of apertures (not shown) for extrudate strands, a cutter plate (10) with a plurality of blades (9) and a drive shaft (4) fixedly connected to the cutter plate (10). The die plate (11) has a first side (11') facing the cutter plate and an opposing second side (11") facing away from the cutter plate. The pelletizer is with the remote alignment adjustment device having a camera (13) which has a mechanical distance measurement probe (20) including a dial indicator gauge which are both connected to a mounting device (22) which is attachable to the drive shaft (4). The cutter plate (10) and the die plate (11) are arranged in a housing with a front part (5), a middle part (6) and a backside (12) having a chamber (7). The chamber (7) is accessible through an opening (8). The drive shaft (4) is connected with one end (4') to a motor (3) that is configured to rotate the shaft with a high speed, alternatively with different speeds from a low speed to a high speed. The cutter plate (10) also has a first side (10') facing away from the die plate (11) and a second side (10") having the blades facing the first side (11') of the die plate (11). Manual adjustment is achieved by regulating screws (2, 2') arranged externally of the chamber (7) for changing the adjustment of the cutter plate (10) or the die plate (11). Clamp locks (21) are arranged on both sides of the chamber (7) for closing the chamber (7).

The remote alignment adjustment device (13) includes the mechanical distance measurement probe (20) having the dial indicator gauge and a camera (13) in form of a flexible endoscope having a gooseneck and being attached to the drive shaft (4) using a clamp and screws of the mounting device (20). The camera (13) contains a wireless transmitter for sending measuring data to the data processing device. The inside of the chamber (7) with the cutter plate (10) and the die plate (11) is shown through a large opening. This large opening is just depicted for the purpose of showing the inside. The cutter plate (10) is accessible through the opening (8). For manual adjustment, visible inspection can occur through the opening.

Figure 2:
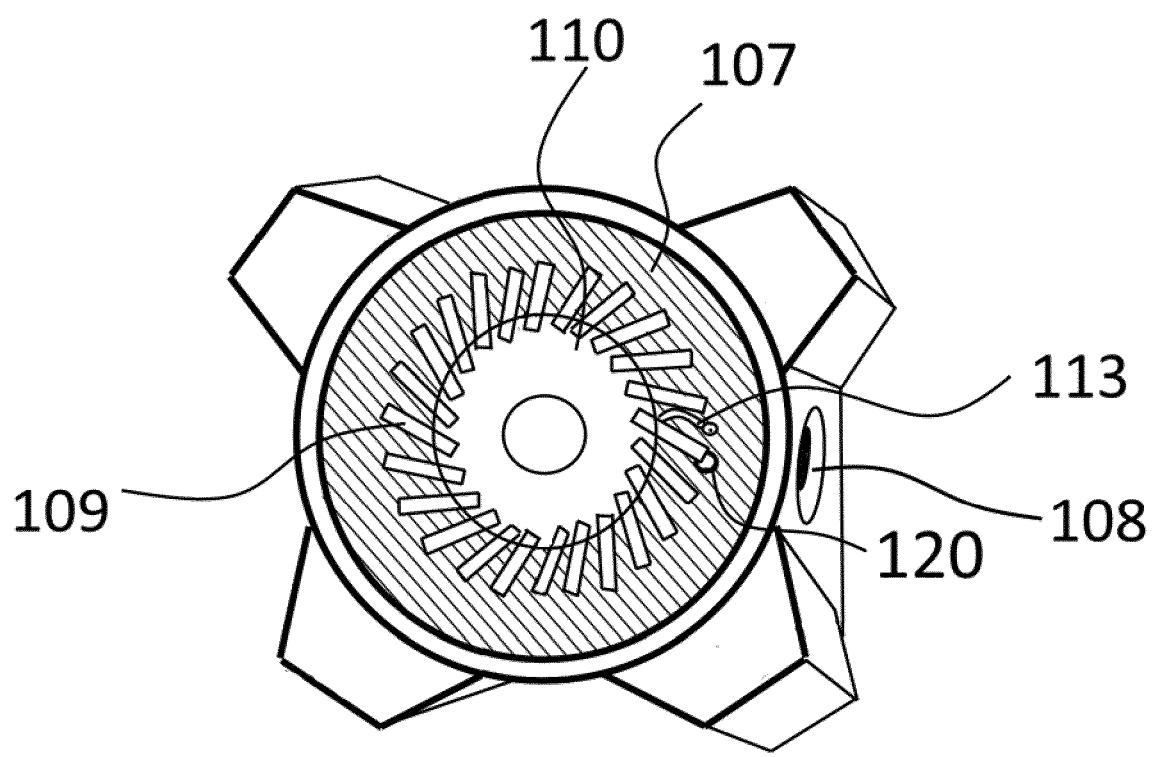
FIG. 2: shows a schematic view of a frontal view of the pelletizer with a remote alignment adjustment device of FIG. 1, wherein a front section and the die plate have been removed to allow a view into the chamber.

FIG. 2 shows a schematic view of the inside of the pelletizer with a remote alignment adjustment device of FIG. 1, wherein the front part of the housing and the die plate is not visible. A cutter plate (110) having a plurality of blades (109) is shown. When the orientation of the cutter plate is corrected, the chamber (107) is closed apart from the opening (108) in a side of the chamber (107). Connected to the central drive shaft for the cutter plate is a remote alignment adjustment device comprising a camera (113). FIG. 2 also shows a dial indicator gauge (120).

Figure 3:
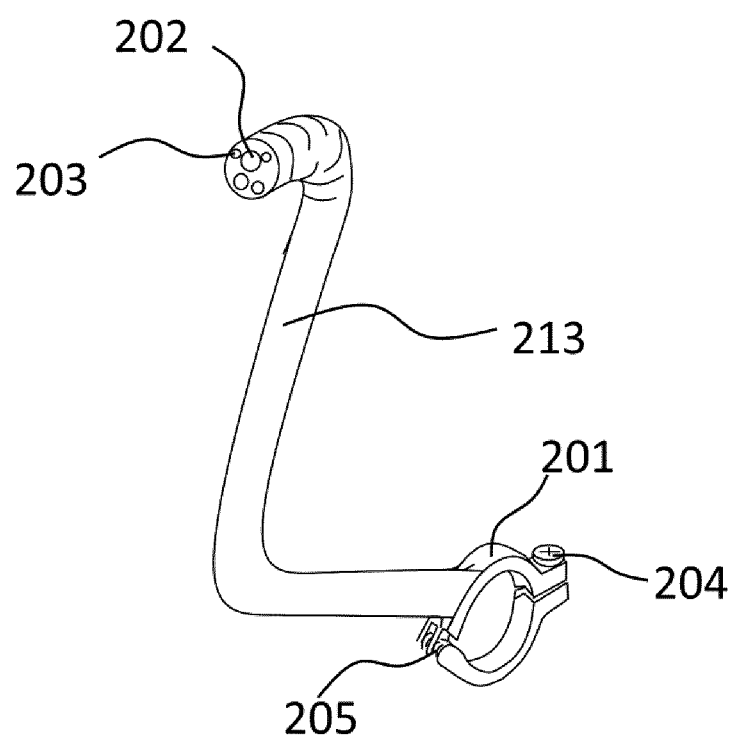
FIG. 3: shows a schematic view of a camera of a remote alignment adjustment device.

FIG. 3 shows a schematic view of a camera (213). The camera (213) includes a light source (203) that is a LED light. Three LED light sources result in a uniform illumination that allows for a more precise adjustment. Additionally, the camera (213) has a camera lens (202). The camera is an endoscope. The gooseneck is flexible. The camera (213) is connectable to a shaft using a clamp (201) having a screw (204). The clamp (201) has a hinge (205) for opening the clamp (201). In some embodiments, a clamp with a screw directly secured within the shaft which has at least one hole, alternatively a hold threaded for receiving a screw. In some embodiments, a separate mechanical distance measurement probe (not shown) and a separate clamp (not shown) are part of the remote alignment device. In some embodiments, the camera is connected to a clamp that carries the mechanical distance measurement probe. In some embodiments, the mechanical distance measurement probe is connected to another clamp (not shown). In some embodiments, the remote alignment device has two spaced apart devices with each device having a separate clamp. In some embodiments, the remote alignment device is a single piece, combining camera and the distance measurement probe.

Figure 4:
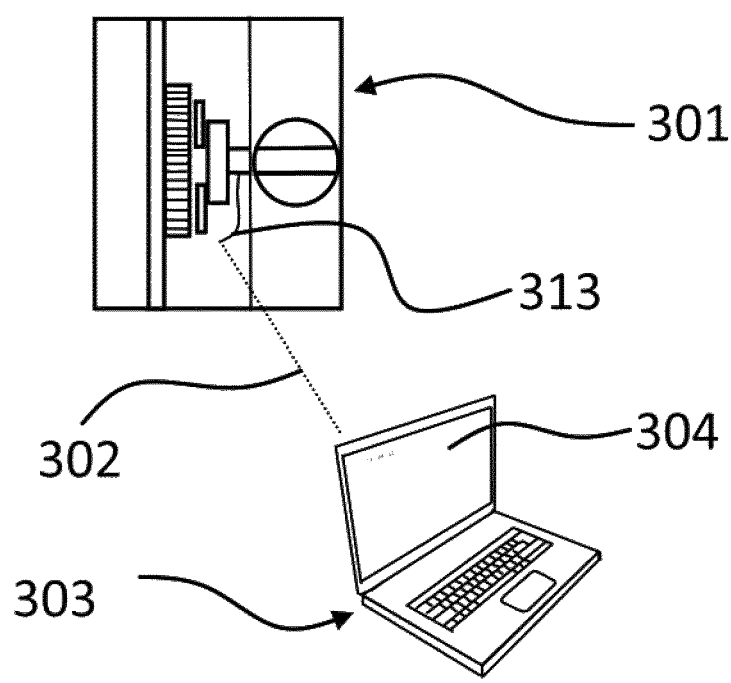
FIG. 4: shows a pelletizer with a remote alignment adjustment device connected to a laptop.

FIG. 4 shows a schematic view of a pelletizer (301), having a wireless connection (302) between a laptop (303) having a display (304) and a remote alignment adjustment device (313).

Figure 5:
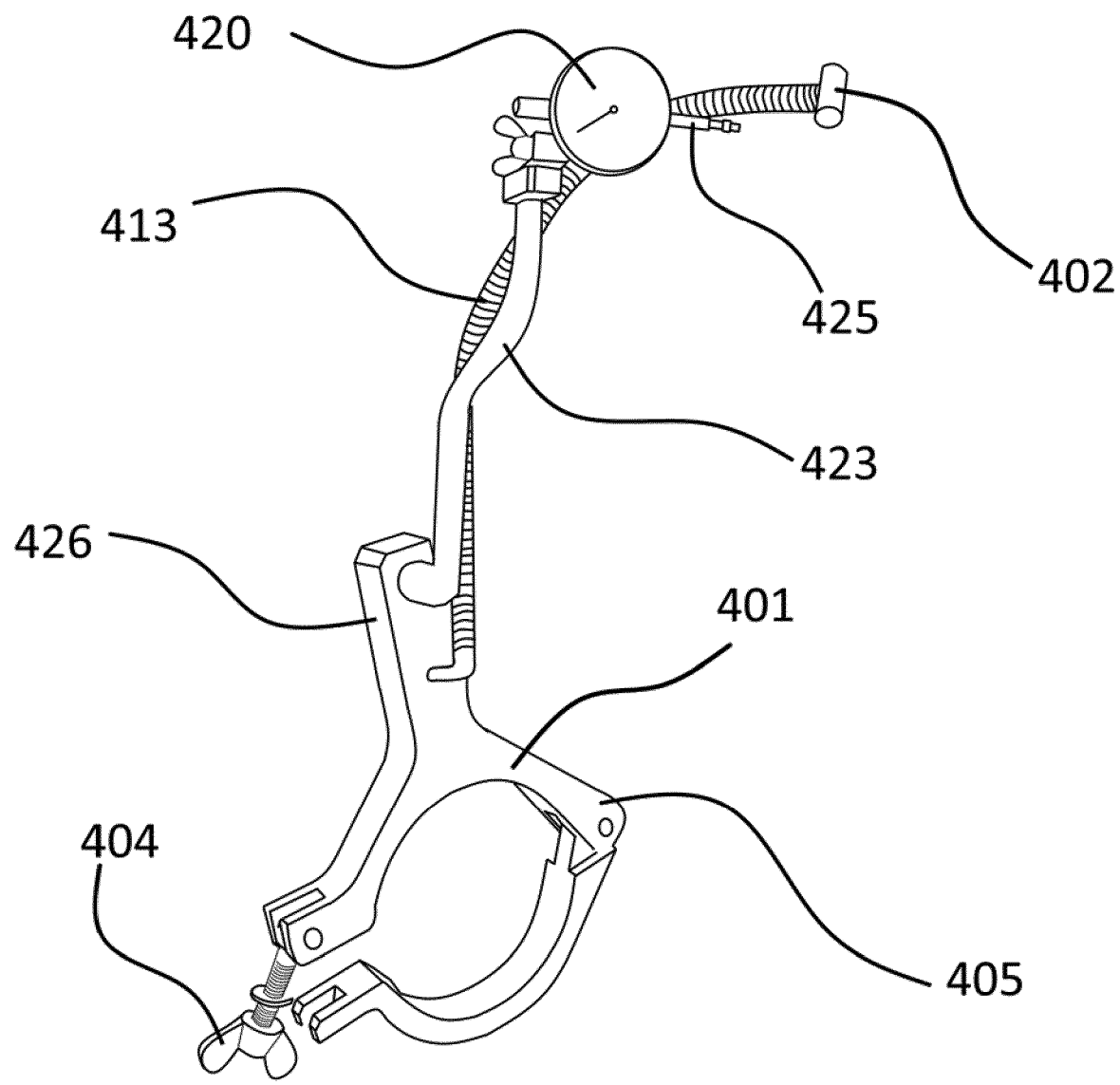
FIG. 5: shows a remote alignment adjustment device having a camera and a mechanical distance measurement probe.

FIG. 5 shows a remote alignment adjustment device (426) having a mechanical distance measurement probe (425) and a mounting device (401) attachable to the drive shaft, wherein the remote alignment adjustment device (426) has a camera (402) for photos or videos and the mechanical distance measurement probe (425) has a dial indicator gauge (420), wherein the camera (402) may take photos or a video of the dial indicator gauge (420), when adjusted correctly. The measuring data includes any photos or video taken with the camera. The alignment adjustment device (426) is connectable to a drive shaft using a mounting device (401) having a clamp and a screw (404). The clamp has a hinge (405) for opening the clamp. The camera is connected by a deformable first connecting structure (413) and the mechanical distance measurement probe as well as the dial indicator gauge by a rigid second connecting structure (423).

What is claimed is:

1. A method for aligning a cutter plate in a pelletizer for polymer pellets using a remote alignment adjustment device, the method comprising:
   providing a pelletizer having:
   a) a cutter plate having a plurality of blades,
   b) a die plate having a plurality of apertures for extrudate strands, a first side facing the cutter plate, and an opposing second side facing away from the cutter plate, and
   c) a drive shaft fixedly connected to the cutter plate, and
   wherein the remote alignment adjustment device is connectable to a data processing device and having a') a mechanical distance measurement probe, b') a camera for taking photos or videos, and c') a mounting device attachable to the drive shaft,
   comprising the steps of:
   i) attaching the remote alignment adjustment device to the drive shaft using the mounting device such that the remote alignment adjustment device is fixedly connected to the drive shaft and the mechanical distance measurement probe contacts a first position of the die plate obtaining measuring data of the first position in form of photos or videos,
   ii) transmitting the measuring data of the first position of the die plate from the remote alignment adjustment device to a data processing device,
   iii) rotating the drive shaft to a second position of the die plate such that the mechanical distance measurement probe contacts a second position of the die plate obtaining measuring data of the second position in form of photos or videos,
   iv) transmitting the measuring data of the second position of the die plate from the remote alignment adjustment device to the data processing device,
   v) adjusting the alignment of the cutter plate or the die plate based on measuring data of the first and second positions supplied by the data processing device, and
   vi) removing the remote alignment adjustment device from the pelletizer.

2. The method according to claim 1, wherein the mechanical distance measurement probe has a dial indicator gauge.

3. The method according to claim 2, wherein the dial indicator gauge is closer to the cutter plate than the camera in steps i) to v).

4. The method according to claim 1, comprising the steps of:
   a1) rotating the drive shaft to a third position of the die plate such that the mechanical distance measurement probe contacts a third position of the die plate obtaining measuring data of the third position in form of photos or videos,
   a2) transmitting the measuring data of the third position of the die plate from the remote alignment adjustment device to the data processing device,
   b1) rotating the drive shaft to a fourth position of the die plate such that the mechanical distance measurement probe contacts a fourth position of the die plate obtaining measuring data of the fourth position in form of photos or videos, and
   b2) transmitting the measuring data of the fourth position of the die plate from the remote alignment adjustment device to the data processing device
   wherein the steps a1), a2), b1) and b2) are performed after step iv) and before step v).

5. The method of claim 1, wherein
   the die plate has a temperature that differs no more than 50° C. from the die plate operating temperature, wherein the die plate operating temperature is the temperature of the die plate when the pelletizer is pelletizing for at least two hours.

6. The method according to claim 1, wherein
   the die plate has a temperature of 180 to 280° C. that is maintained by heating the die plate with a heating fluid.

7. The method according to claim 1, wherein
   the mounting device has a flexible and deformable connecting structure that remains rigid when no stronger force than the force of gravitation is applied.

8. The method according to claim 1, wherein
   the mounting device has a clamp or screws for fixedly connecting the remote alignment adjustment device to the drive shaft.

9. The method according to claim 1, wherein
   the remote alignment adjustment device has a light source.

10. The method according to claim 1, wherein
    the polymer pellets are made from polyethylene.

11. The method according to claim 1, wherein
    the remote alignment adjustment device is connected wirelessly to the data processing device.

12. The method according to claim 1, wherein
    the data processing device is configured to analyze the measuring data of the mechanical distance measurement probe and to provide adjustment values based on the measuring data for manual adjustment of the cutter plate or the die plate, and
    wherein step v) includes a sub-step of the data processing device converting the measuring data into adjustment values and the adjustment values are the basis for adjusting the alignment of the cutter plate or the die plate.

13. The method according to claim 12, wherein
    the cutter plate and the die plate are arranged within a chamber and the manual adjustment is provided by regulating screws arranged externally of the chamber for changing the adjustment of the cutter plate or the die plate.

14. The method according to claim 1, wherein
    the cutter plate and the die plate are arranged within a chamber which is configured and designed to be filled with water and the chamber has a reclosable opening for insertion of the remote alignment adjustment device.

15. A process for preparing polyethylene pellets in a pelletizer comprising
    providing a pelletizer having a) a cutter plate having a plurality of blades, b) a die plate having a plurality of apertures for extrudate strands, a first side facing the cutter plate, and an opposing second side facing away from the cutter plate, and c) a drive shaft fixedly connected to the cutter plate, wherein the cutter plate and the die plate are arranged within a chamber,
    providing a remote alignment adjustment device connectable to a data processing device and having a') a mechanical distance measurement probe, b') a camera for taking photos or videos, and c') a mounting device attachable to the drive shaft,
    comprising the steps of:
    1) melting polyethylene in an extruder, 2) pushing of the melted polyethylene through the die plate, thereby forming extrudate strands,
3) cutting the resulting strands with the blades of the cutter plate into pellets,
4) stopping the extruder and the pelletizer for maintenance,
5) removing water from the chamber,
6) aligning of the cutter plate or the die plate by the method of claim 1,
7) refilling the chamber with water, and
8) continuing with pelletizing in accordance with steps 1) to 3).

16. The method of claim 1, further comprising, after step v) and before step vi), a step of rotating the drive shaft to a first position of the die plate and thereafter repeating steps ii) to v).

17. The method of claim 16, wherein, before step vi), the steps of rotating the drive shaft to a first position of the die plate and repeating steps ii) to v) is repeated until the alignment of the cutter plate is parallel to the die plate.

18. The method of claim 4, further comprising, after step v) and before step vi), a step of rotating the drive shaft to a first position of the die plate and thereafter repeating steps ii), iii), iv) a1), a2), b1), b2) and v).

19. The method of claim 18, wherein, before step vi), the steps of rotating the drive shaft to a first position of the die plate and repeating steps ii), iii), iv) a1), a2), b1), b2) and v) is repeated until the alignment of the cutter plate is parallel to the die plate.

* * * * *

UNITED STATES PATENT AND TRADEMARK OFFICE
CERTIFICATE OF CORRECTION

PATENT NO. : 11,148,316 B2
APPLICATION NO. : 16/640019
DATED : October 19, 2021
INVENTOR(S) : Wiradjaja et al.

It is certified that error appears in the above-identified patent and that said Letters Patent is hereby corrected as shown below:

On the Title Page

Item [30], delete "17187821" and insert -- 17187821.8 --, therefor

Signed and Sealed this
Twenty-first Day of February, 2023

Katherine Kelly Vidal
*Director of the United States Patent and Trademark Office*